(12) United States Patent
Chang et al.

(10) Patent No.: US 6,374,009 B1
(45) Date of Patent: Apr. 16, 2002

(54) TEMC FIBER BASED OPTICAL SWITCH

(75) Inventors: Kok Wai Chang, Sunnyvale; Hongwei Mao; Bo Cai, both of San Jose, all of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/307,959

(22) Filed: May 10, 1999

(51) Int. Cl.[7] ................................................. G02B 6/26
(52) U.S. Cl. ............................. 385/18; 385/16; 385/21; 385/22
(58) Field of Search ........................ 385/16, 18, 20–23

(56) References Cited

U.S. PATENT DOCUMENTS

| | | | |
|---|---|---|---|
| 4,178,073 A | 12/1979 | Uchida et al. | 350/151 |
| 4,626,066 A | * 12/1986 | Levinson | 350/96.18 |
| 4,653,852 A | 3/1987 | Suzuki et al. | 350/96.33 |
| 4,974,944 A | 12/1990 | Chang | 350/377 |
| 5,268,979 A | 12/1993 | Weidman | 385/42 |
| 5,355,426 A | 10/1994 | Daniel et al. | 385/39 |
| 5,381,503 A | 1/1995 | Kanamori et al. | 385/123 |
| 5,444,801 A | * 8/1995 | Laughlin | 385/16 |
| 5,446,578 A | 8/1995 | Chang et al. | 359/282 |
| 5,471,340 A | 11/1995 | Cheng et al. | 359/281 |
| 5,481,631 A | * 1/1996 | Cahill et al. | 385/18 |
| 5,574,596 A | 11/1996 | Cheng | 359/484 |
| 5,594,821 A | 1/1997 | Cheng | 385/24 |
| 5,644,666 A | 7/1997 | Campbell et al. | 385/43 |
| 5,734,763 A | 3/1998 | Chang | 385/11 |
| 5,768,005 A | 6/1998 | Cheng et al. | 359/281 |
| 5,825,950 A | 10/1998 | Cheng | 385/27 |
| 6,002,818 A | * 12/1999 | Fatchi et al. | 385/17 |

* cited by examiner

Primary Examiner—Akm E. Ullah
Assistant Examiner—Jennifer Doan
(74) Attorney, Agent, or Firm—Lacasse & Associates; Randy W. Lacasse; Kevin E. Greene

(57) ABSTRACT

An optical switch having a TEMC fiber and a displacement plate. The TEMC fiber having an input core and a plurality of output cores. The displacement plate coupled to the TEMC fiber to receive a light beam from the input core. The displacement plate to direct the light beam to one of the plurality of output cores by rotating the displacement plate a predetermined angle.

16 Claims, 15 Drawing Sheets

TEMC FIBER BASED OPTICAL SWITCH

FIELD OF THE INVENTION

This invention relates to the field of fiber optics and, more specifically, to fiber optical switches.

BACKGROUND

Fiber optic switches are used in fiber optic networks to switch signals between different optical fibers. The optical fibers used in these networks typically consist of a core surrounded by a cladding, and one or more layers of protective coatings. The core and cladding are typically made of glass or polymer materials. Core diameters are typically in the range of 5 to 10 $\mu$m with an outside fiber diameter of 125 $\mu$m.

One prior art optical switch used a glass plate and a lens to switch light from an input optical fiber to a group of single optical fibers positioned opposite to the input fiber. One problem with such an optical switch is that distance between the cores of the group of single optical fibers may be large, requiring a thick glass plate and a large lens in order to focus light from the input fiber into one of the group of single optical fibers. The thicker plate and larger lens undesirably increases the size of the optical switch.

In one prior art optical switch, the switching operation is effectuated by the movement of an input optical fiber relative to the ends of a group of single optical fibers positioned opposite to the input fiber. To form an optical path a motor is used to move the end of the input optical fiber until it is aligned with the end of a selected fiber from the group of single optical fibers.

One problem with such an optical switch is that it has a slow switching speed and consumes large amounts of power to move the end of the single optical fiber across the entire width of the input ends of the group of single fibers. Furthermore, since the width of the input ends of the group of single fibers is large, alignment of single optical fiber with the group may be difficult. Any alignment inaccuracies between the fibers result in higher insertion loss and lower immunity from cross-talk.

SUMMARY OF THE INVENTION

The present invention pertains to a method and apparatus for switching optical signals. The optical switch including a TEMC fiber and a displacement plate. The TEMC fiber having an input core and a plurality of output cores. The displacement plate coupled to the TEMC fiber to receive a light beam from the input core. The displacement plate to direct the light beam to one of the plurality of output cores.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying and in which.

DETAILED DESCRIPTION

In the following description, numerous specific details are set forth such as examples of specific materials, process steps, process parameters, dimensions, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

A method and apparatus for switching optical signals is described. In one embodiment, the optical switch includes a thermally expanded multiple core (TEMC) fiber and a displacement plate. The TEMC fiber contains an input core and multiple output cores. The displacement plate is coupled to the TEMC fiber to receive a light beam from the input core and direct a reflected light beam to one of the output cores.

In one of the embodiments described below, a fusion process is used to manufacture the TEMC fiber resulting in a fiber having cores spaced close together with expanded mode field diameters. The close spacing between the cores of the TEMC fiber may reduce the degree of rotation of the displacement plate necessary to couple light from the input core to one of the output cores, thereby increasing switching speeds. The expanded mode field diameters of the cores may reduce the amount of divergent light emitted from the cores, thereby improving the efficiency of light coupling between the input core and an output core.

Figure 1:
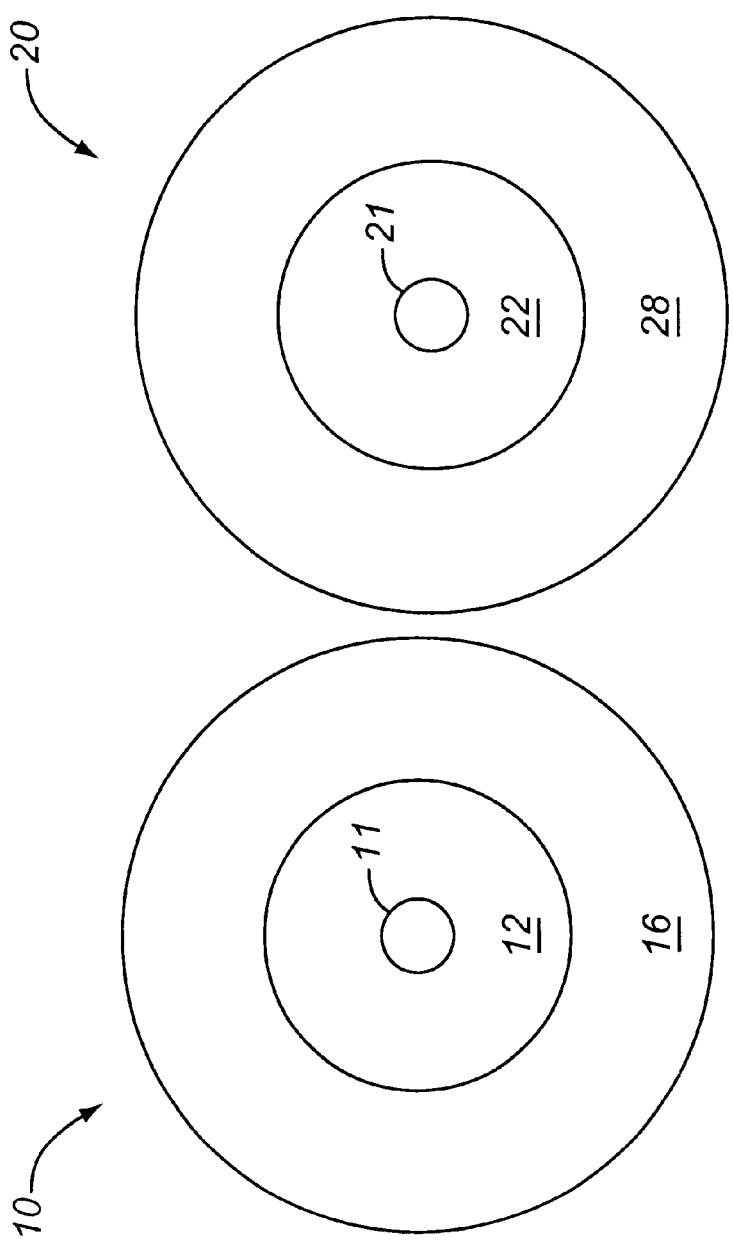
FIG. 1 illustrates a cross-section of two single core fibers.

In one embodiment, the TEMC fiber is manufactured using multiple single core fibers as illustrated in FIG. 1. It should be noted that two fibers are shown in some of the following figures only for ease of illustration and that the multiple core fiber and its fabrication process are not limited to only two fiber cores.

FIG. 1 illustrates a cross-section of two single core fibers. The fibers 10 and 20 have cores 11 and 21, respectively, surrounded by claddings 12 and 22, respectively. The claddings 12 and 22 are encased in outer jackets 16 and 18, respectively (not drawn to scale). In one embodiment, single mode fibers having step index core profiles are used, for example, SMF 28 manufactured by Corning of Corning, N.Y. SMF 28 fiber has a nominal mode field diameter of approximately 9 microns (μm). In another embodiment, single mode fibers having other diameters and profiles may be used. In yet another embodiment, fibers carrying more than one mode may be used.

In cores having step index profiles, light waves follow straight line trajectories until they reach the core-cladding boundary, at which the light waves bend abruptly. The propagation of the light waves through the core is based on the numerical aperture (NA) of the core, which is a function of the index of refraction of the core. The numerical aperture is independent of the position of the incident waves because cores with step index profiles have the same index of refraction throughout their radius.

In contrast, for cores with graded index profiles, the index of refraction is a function of the distance along the diameter of the core and, thus, light waves bend continuously, rather than abruptly, near the core-cladding boundary. In addition, because the index profile is graded, the numerical aperture of the core is a function of the position of the entering light waves.

Figure 2B:
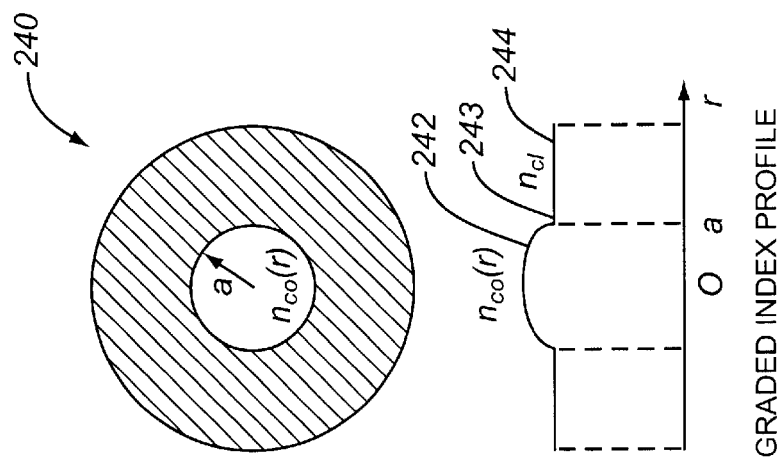
FIG. 2 illustrates the profiles of a step index fiber and a graded index fiber.
Figure 2A:
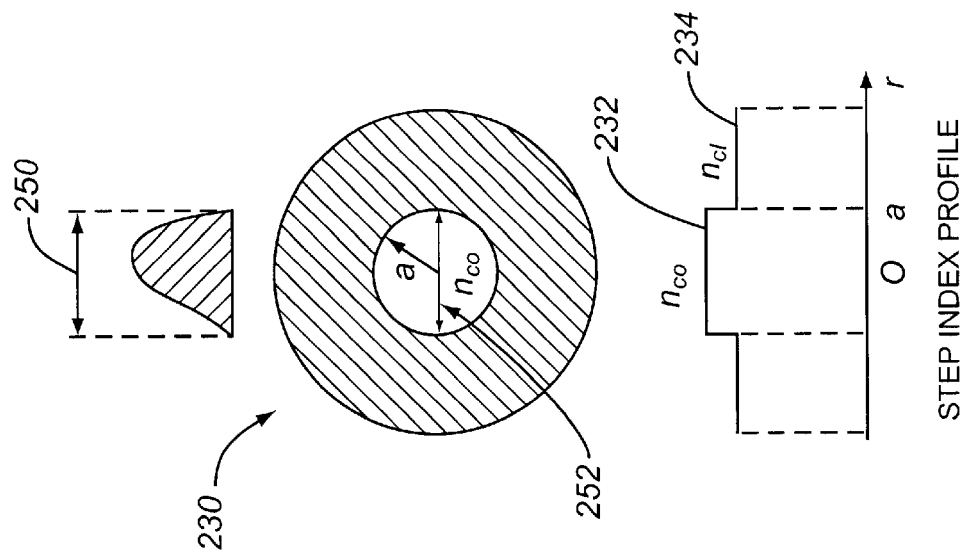

FIGS. 2A and 2B illustrate the profiles of a step index fiber and a graded index fiber. The nomenclature $n_{co}$ is the index of refraction of the core and $n_{cl}$ is the index of refraction of the cladding. For a step index fiber 230 the index of refraction 232 is approximately uniform in the core region. The index of refraction steps down at the core boundary to a lower index of refraction 234 in the cladding region where it remains approximately uniform throughout the cladding. A lower index of refraction is used in the cladding in order to achieve total internal reflection of the light beam as it travels along the core.

For a graded index fiber 240, the index of refraction in the core region 242 is a function of the radial distance from the core center. The index of refraction in the core 242 is given by $n_{co}(r)$ with $r \leq a$ where a is the core radius and r is the radial distance from the core center. The index of refraction in the core 242 decreases as the radial distance from the core increases until it approximately matches the index of refraction of the cladding 244 at the boundary 243.

Light waves propagating down the core and cladding of the fiber can be characterized by different modes based on electric, magnetic, and electromagnetic fields operating on the fiber. In step index fibers with circular cross sections, as illustrated in FIG. 2A, the field distributions can be identified by a combination of the different modes, known as a mode field. The mode field has a light carrying diameter that is not the same as the physical diameter of the fiber. The mode field diameter, for any given wavelength of light, is affected by the indices of refraction of the core and the cladding. The mode field diameter (MFD) is characterized by a hyperbolic function which may be approximated according to the following formula:

$$MFD = 2\omega$$

where $$\omega \approx (NA \times \pi)/\lambda$$

and where λ equals the wavelength of light propagated through the fiber.

The mode field diameter may extend out into the cladding region and, as such, will be larger than the physical diameter of the core. In one embodiment, for example, for light waves having a wavelength of 1550 nanometers, the mode field diameter 250 may be approximately 9 μm, whereas the physical core diameter 252 may be approximately 8 μm.

Referring again to FIG. 1, the single core fibers 10 and 20 are stripped of a portion of their outer jackets 16 and 28, and the claddings 12 and 22 are aligned together along a predetermined length of the exposed claddings. In one embodiment, the claddings 12 and 22 are aligned by placing claddings 12 and 22 on a plate such that the centers of their respective cores are in substantial alignment along one line and held in place using a securing tool. The claddings 12 and 22 are then joined along the predetermined length using a fusion process.

Figure 3:
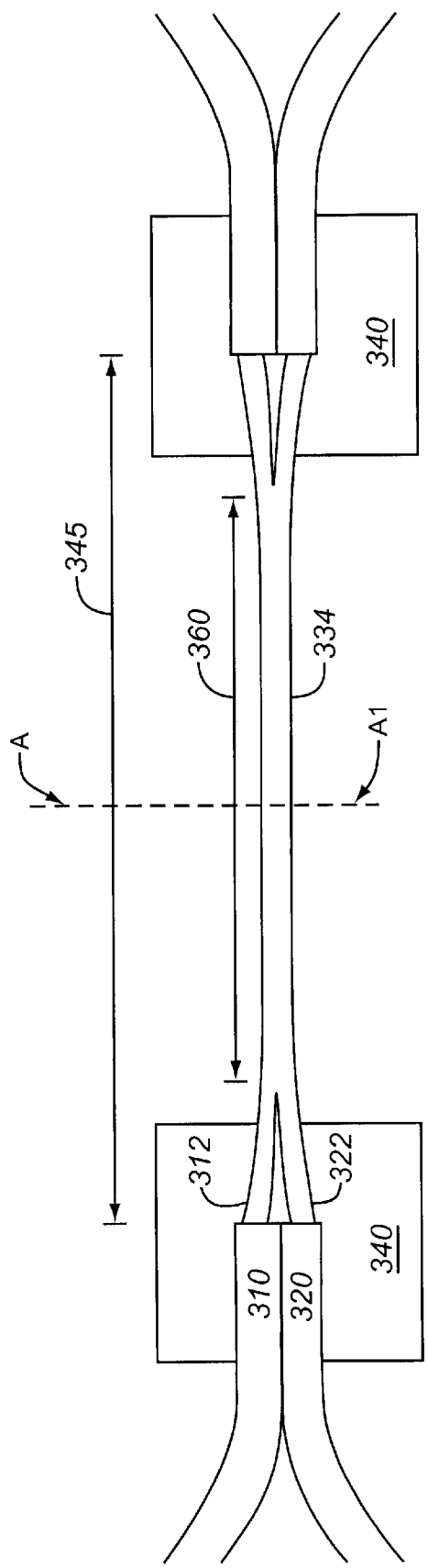
FIG. 3 illustrates one embodiment of a fusion process.

FIG. 3 illustrates one embodiment of a fusion process. The single core fibers 310 and 320 are stripped of their outer jackets, exposing claddings 312 and 322 along segment 345 of the fibers. The fibers 310 and 320 are then placed on an alignment bar 340 that aligns the claddings 312 and 322 along a length 360. In one embodiment, the claddings 312 and 322 are aligned along a length 360 of approximately 8 millimeters. In another embodiment, the claddings 312 and 322 are aligned along a different length.

In one embodiment, a heat source (not shown) located underneath claddings 312 and 322 is applied along the entire length 360. Claddings 312 and 322 are heated to a temperature above the melting point of the cladding material in order to fuse the cladding 312 and 322 of the two cores (not shown). The claddings 312 and 322 are fused together along length 360 forming a common cladding 334. In one embodiment, heat source 470 is a gas flame. In another embodiment, other heat sources may be used that are well known in the art, for examples, an induction heater or a laser.

In one embodiment, the claddings 322 and 312 are heated to a temperature of approximately 1,700 degrees C. +/−200 degrees C. In another embodiment, the claddings are heated to other temperatures based on the material used for claddings 322 and 312. As the claddings 312 and 322 are fused together, the heat source operates to gradually expand the mode field diameter of the cores (not shown) in the common cladding region along length 360. The mode field diameters of claddings 312 and 322 outside of length 360 will also be affected by heat source. However, the mode field diameters of claddings 312 and 322 outside length 360 will expand to a lesser extent than the mode field diameters within common cladding 334 because the claddings outside length 360 are not directly exposed to the heat source and, thus, heated at a lower temperature.

Figure 4:
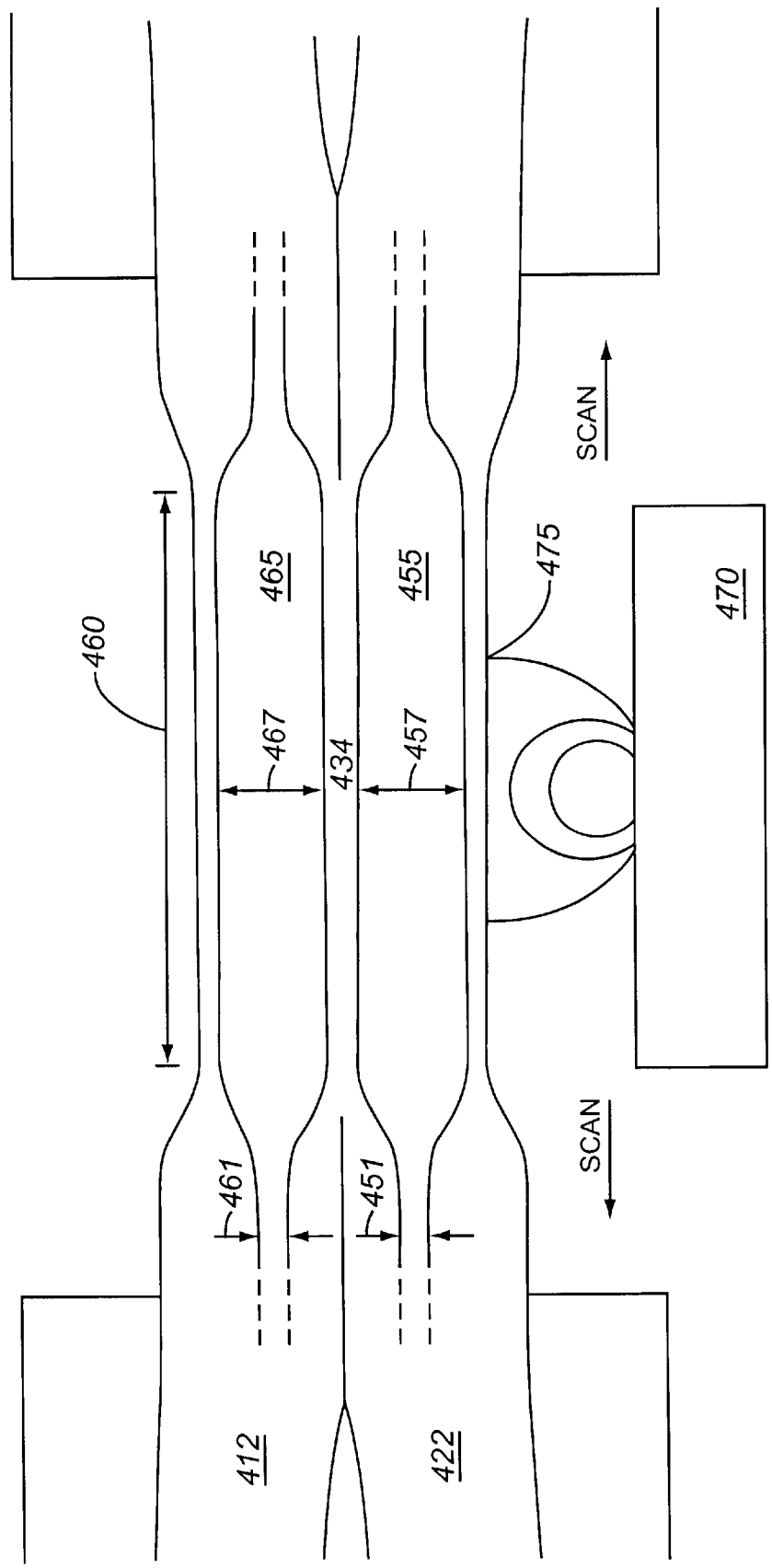
FIG. 4 illustrates another embodiment of a fusion process.

FIG. 4 illustrates another embodiment of a fusion process. A heat source 470 is applied to the exposed common cladding 434 to expand the mode field diameters of the cores inside the cladding. It should be noted that the heat source 470 is drawn on one side of the cores in FIG. 4 only for ease of illustration and that the heat source 470 is actually positioned in a manner to provide for uniform heating of the claddings.

Heat source 470 is applied to a segment of length 460 and continually scanned across length 460 to uniformly expand the mode fields of the cores. When heat source 470 comes into contact 475 along different segments of length 460, claddings 412 and 422 begin to fuse together forming common cladding 434. In addition, the mode fields 455 and 465 of the cores begin to expand from their original diameters 451 and 461, respectively, to diameters 457 and 467, respectively. As the cladding region 434 is heated, the index profiles of the cores inside cladding region 434 change from a step index to that of a graded index that tapers off at the core-cladding boundary as discussed above. In one embodiment, heat source 470 is scanned at a constant rate across length 460. In another embodiment, heat source 470 is scanned across length 460 at a varying rate in order to gradually expand mode fields from their original diameters at the end of length 460 to diameters 467 and 457 in the middle of length 460.

The mode field expansion in the fiber is based on the rate at which the heat source 470 is scanned across length 460 of the common cladding 434. A slower scan rate will result in a greater the mode field expansion if the scan time remains the same. In one embodiment, heat source 470 is scanned at a rate of approximately 2 millimeter per second (mm/sec). In another embodiment, heat source 470 is scanned at a different rate to achieve a different mode field expansion. In another embodiment, the scan rate may be varied in a different manner along length 460, for examples, linearly, exponentially, and incrementally stepped. As a result, the mode field of the cores are gradually expanded from their initial diameter to a wider diameter at the center of the length 460 of the fused cladding region.

By changing the index of refraction in the cores to a graded index profile and, thus, expanding the mode field diameters of the cores, light may be propagated through a larger area of the fiber. Changing the index of refraction in a fiber core to a graded index profile results in a narrowing of the width of a light pulsed through the fiber that may allow for an increase in information transmission rate through the fiber.

Referring still to FIG. 4, the change in the index profile alters the numerical aperture of the fiber cores (not shown) and increases their mode field diameters to diameters 457 and 467. In one embodiment, after the scanning stage, the mode field diameters of the cores are expanded by approximately a factor of two. In another embodiment, the mode field diameters are expanded by other factors. If the numerical aperture of a starting single mode core is 0.1, for example, and the mode field diameter is expanded by a factor of 2, then the numerical aperture will be approximately reduced by half. Correspondingly, if the mode field diameter is expanded from 10 $\mu$m to 30 $\mu$m, for example, then the numerical aperture will be approximately reduce by one third. A lower numerical aperture will reduce the amount of divergent light emitted from the fiber and, thus, may facilitate switching between fiber cores or coupling to other fibers.

In another embodiment, the heat source 460 is scanned for a different time and at a different temperature and rate to reflow the cladding material in order to decrease transmission loss in the fiber cores. Various factors cause transmission loss in the fiber including diameter variations, core and cladding material irregularities, and impurities. By reflowing the core and cladding material, these defects may be reduced.

Figure 5:
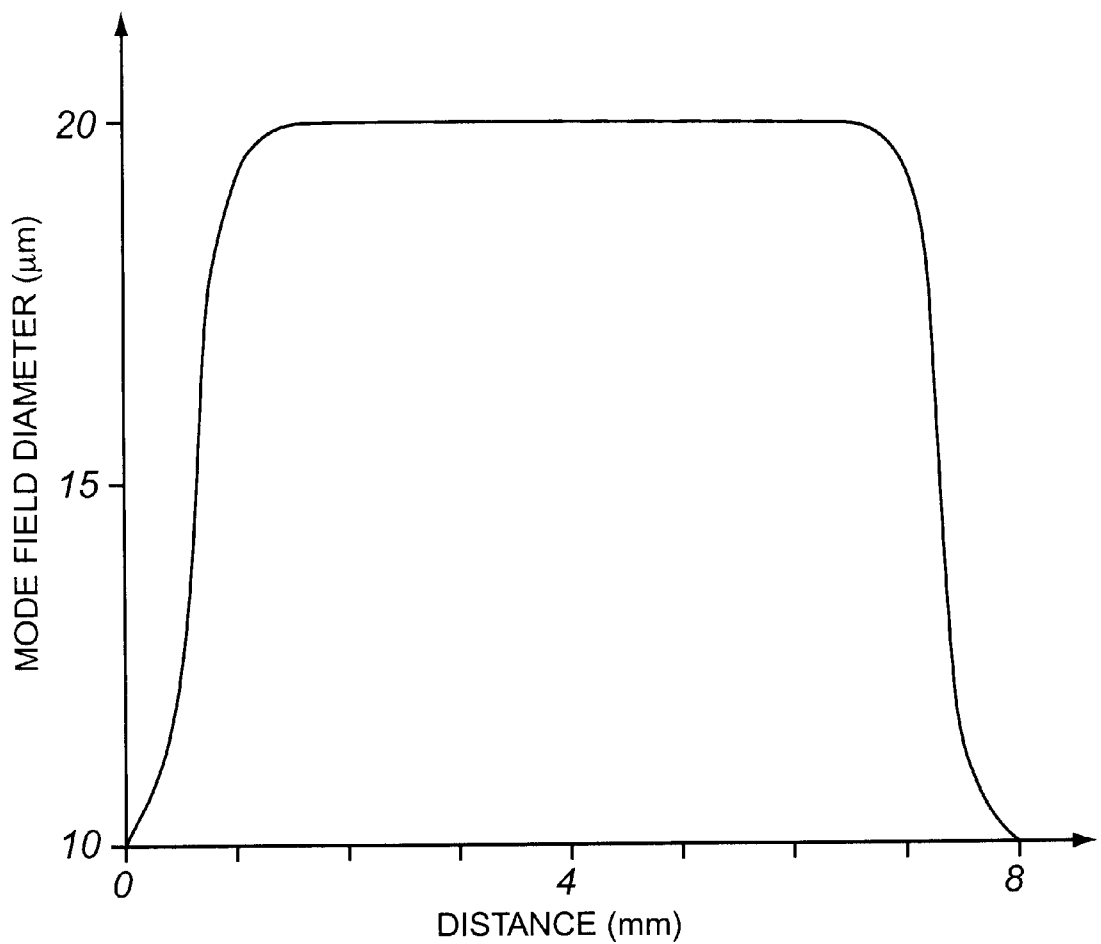
FIG. 5 illustrates a mode field expansion over a length of a fiber.

FIG. 5 illustrates an exemplary mode field expansion over a length of the fiber resulting from use of the above process. In the illustrated example, the mode fields of the fiber cores have been expanded over an 8 mm length of fused cladding material. The mode field diameter of a single core is 10 $\mu$m outside the length of the fused cladding material. The heat source is scanned across the 8 mm length, increasing the mode field diameters of the cores to a maximum of approximately 20 $\mu$m near the center region of the fused cladding. It should be noted that FIG. 5 illustrates only an example of the mode field distribution. In other embodiments, the mode field diameter may have other distributions over the length of the fused cladding.

Figure 6:
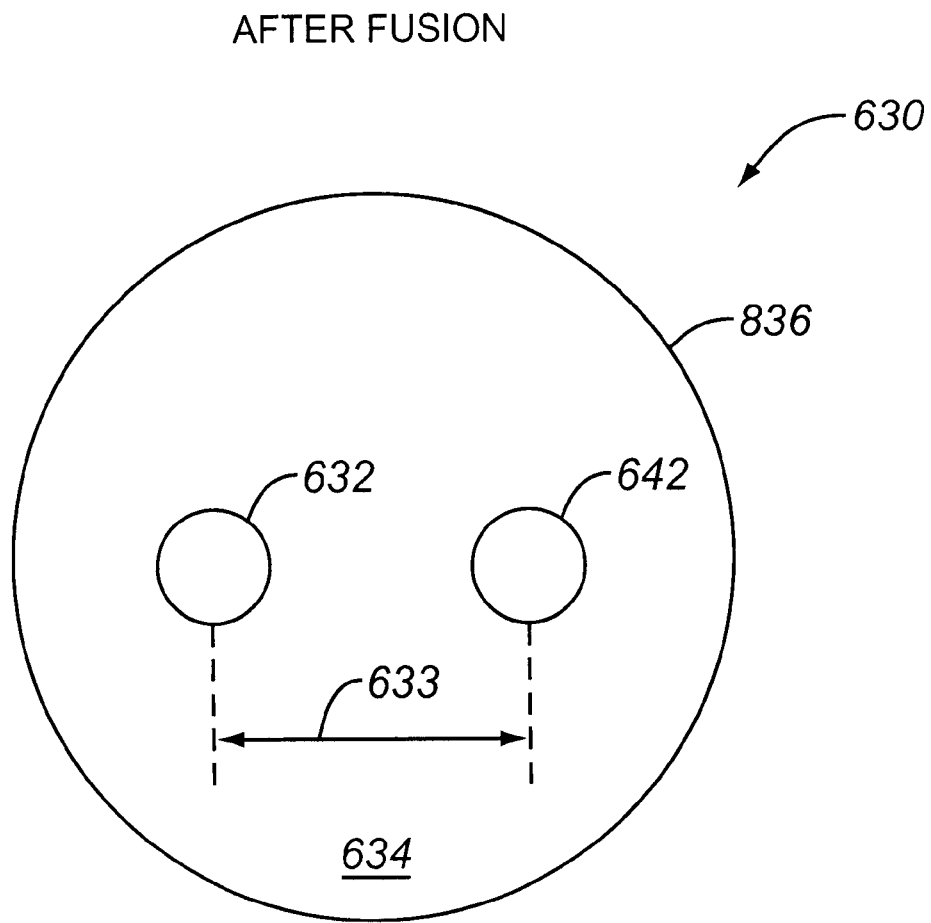
FIG. 6 illustrates a cross-section of one embodiment of a fiber after a fusion process.

FIG. 6 illustrates a cross-section of one embodiment of a fiber after a fusion process. After the fusion process, the cores 632 and 642 of fiber 630 are closer together than before the fusion process. The cores 632 and 642 are also substantially parallel with respect to each other along the length of the fused cladding. In one embodiment, for example, the cladding is fused along a length of 8 millimeters and the centers of the cores 632 and 642 have less than a 4 $\mu$m deviation of alignment over the length of the fused cladding. In one embodiment, the spacing 633 between the centers of the cores 632 and 642 after the fusion process is approximately 62.5 $\mu$m. In one embodiment, the outer surface 636 of common cladding 634 is approximately circular. In another embodiment, the outer surface 636 of common cladding 634 has other approximate shapes, for example, ovate.

The closer spacing between fiber cores may allow for more precise alignment between the cores than using, for example, two standard 125 $\mu$m (outer diameter) single core fibers having centers spaced 125 $\mu$m apart, that are inserted into a cylindrical jacket. It should be noted that although the cores have been brought closer together, the distance between the cores remains large enough so that there is no significant coupling, or cross-talk, between the cores.

Figure 7A:
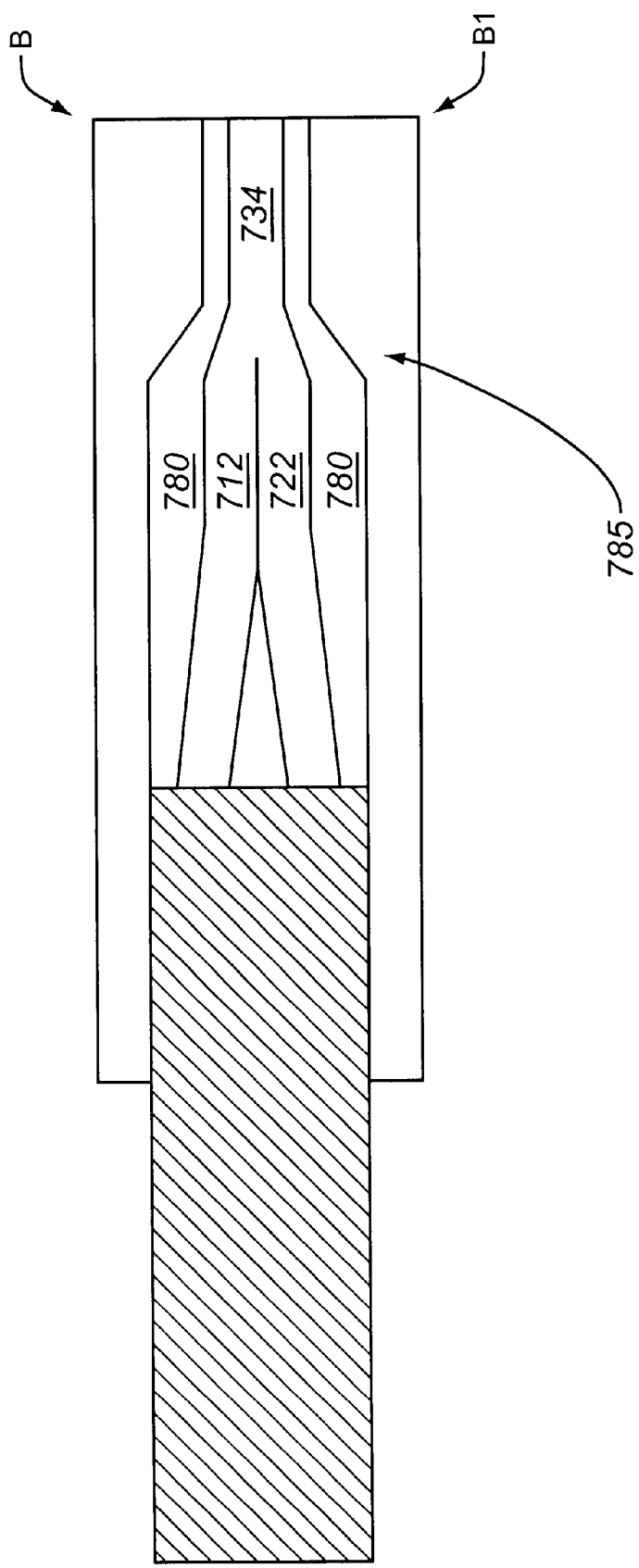
FIG. 7A illustrates one embodiment of a multiple core fiber in a capillary tube.

FIG. 7A illustrates one embodiment of a multiple core fiber in a capillary tube. After the fusion process, the fiber may be cut along a cross section AA1 of FIG. 3 of the region of common cladding and placed into a capillary tube 785 to create a fiber end having multiple non-coupled cores that are in substantial alignment along one line. An epoxy 780 is placed in between the cladding 734 and the capillary tube 780 to hold the cladding stationary within capillary tube 780. Such a fiber may be used in switching or coupling applications with more precision than when using a group of single core fibers placed next to each other. In addition, since the fiber is not processed using a stretching operation, less stressed may be introduced into the fiber than in prior fiber coupling processes. Lower stress in the fiber may result in improved signal transmission performance.

Figure 7B:
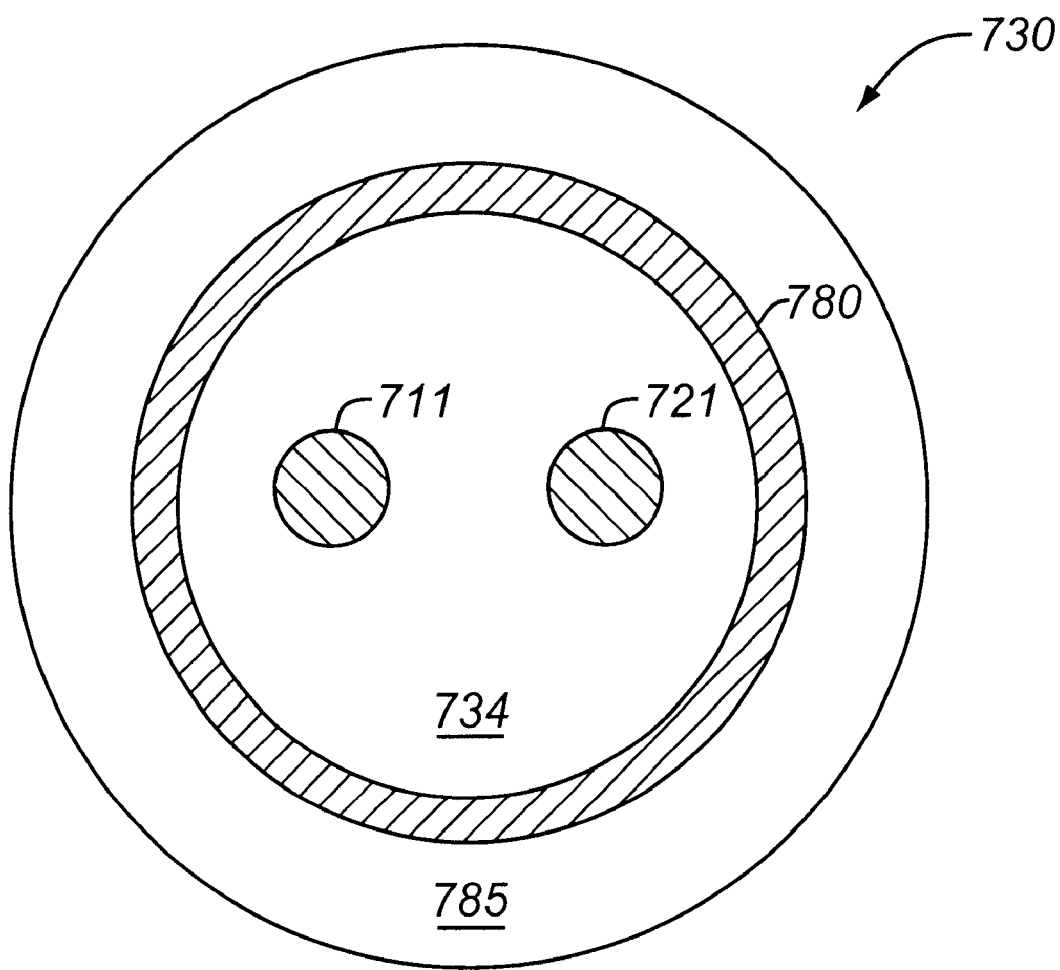
FIG. 7B illustrates a cross-section of one embodiment of a multiple core fiber in a capillary tube.

FIG. 7B illustrates a cross-section of one embodiment of a multiple core fiber in a capillary tube. The cross-section is taken along line BB1 of FIG. 7A. The cores 711 and 721 of fiber 730 are substantially parallel with respect to each other along the length (into the page) of the common cladding 734. In one embodiment, the common cladding 734 resulting after the fusion process is approximately cylindrical resulting in approximately a uniform gap between common cladding 734 and capillary tube 785. As such, epoxy 780 is generally uniformly distributed between the common cladding 734 and the capillary tube 785. The use of less epoxy and the uniform distribution of the epoxy may reduce stress induce effects resulting from the epoxy, thereby improving the reliability of the fiber.

Figure 8:
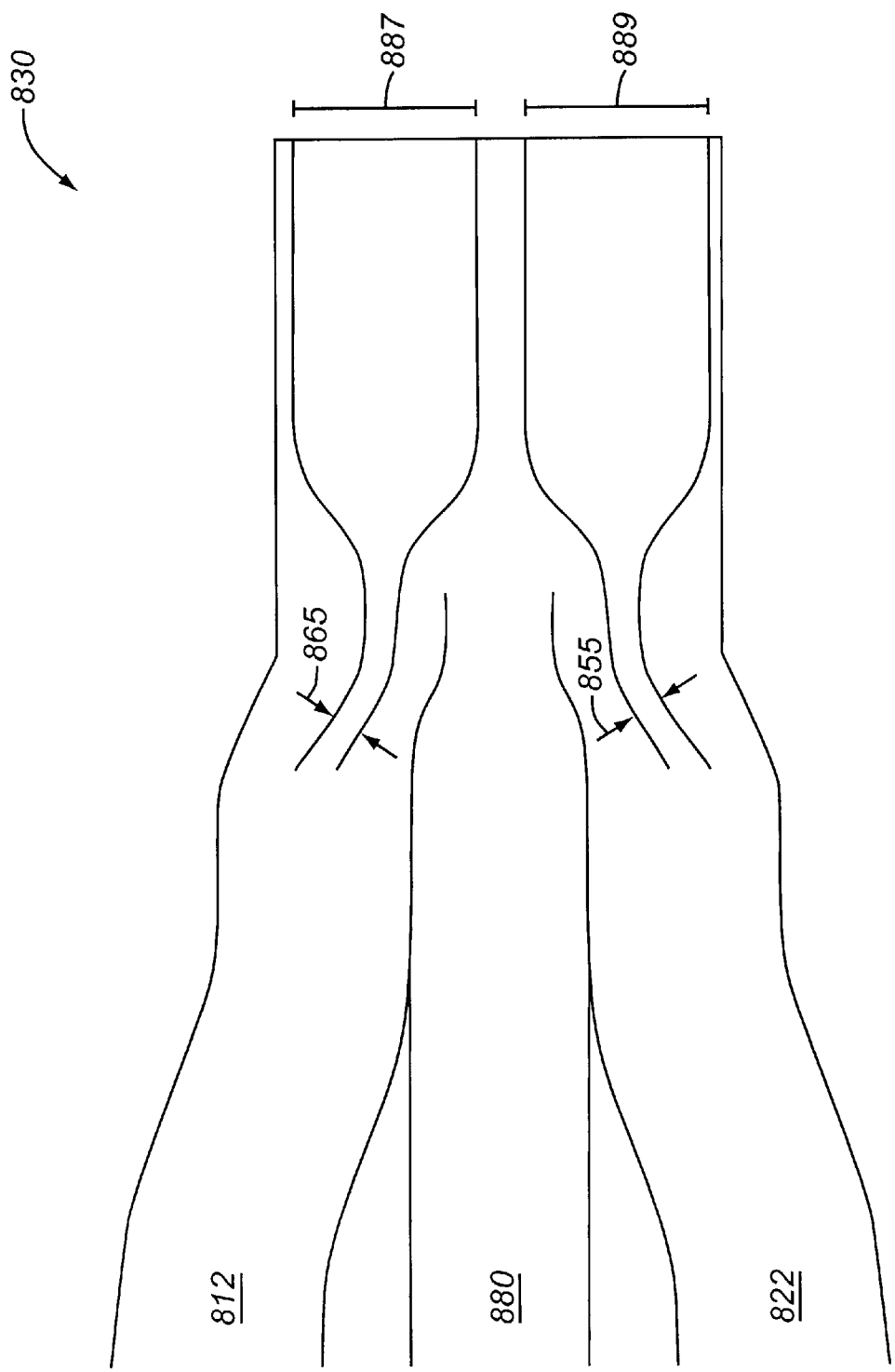
FIG. 8 illustrates a longitudinal cross-section of one embodiment of a multiple core fiber having a non-core spacer.

FIG. 8 illustrates a longitudinal cross-section of one embodiment of a multiple core fiber having a non-core spacer. Multiple core fiber 830 includes a spacer 880 in between claddings 812 and 822. As discussed above, heating the fiber cores results in an expansion of the mode field diameters of the cores. With continued heating, the mode field expansion may become so large that there may be overlap between the mode fields of the different cores within a common cladding. This may result in an undesirable coupling between the signals carried in the different cores. Spacer 880 may be used to physically separate the cores of claddings 812 and 822 so that their mode fields 887 and 889, respectively may be further expanded. The spacer 880 (also known as a non-core fiber) is constructed from a material similar to the cladding material with the same refractive index but with no guiding properties, for example, silica. In one embodiment, spacer 880 is used to allow for greater mode field expansion while minimizing coupling between the cores.

In another embodiment, the non-core spacer 880 may be used to reduce, or even minimize, diffraction effects at the core-air interface. Diffraction effects are caused by interference at the glass-air boundary at the end of the fiber. The diffraction effects result in insertion losses which reduce the amount of power that may be transferred between fibers. By adding a non-core spacers, for example, the total outside diameter of the fiber is increase by a factor of the square root of three. In general, a wider diameter fiber results in less divergence of light waves exiting the end of the fiber.

In addition, the use of the spacer fiber allows for physical separation of the light waves exiting the cores. Light exiting from cores separated by different physical dimensions will have different incident angles on components that are coupled to the end of the fiber. For example, if a lens is coupled to the end of the fiber, the light waves from an outer core separated by two non-core spacers will be incident on the lens at a different angle than light emitted from a central core. In one embodiment, a filter is used to filter out light waves from the cores based on the incidence angle of light on the lens emitted from the cores.

It should be noted that the process described herein is not limited to only twin core fibers or fibers using a single spacer and may be used to manufacture fibers having more than two cores and utilizing more than a single spacer as illustrated in FIG. 8.

Figure 9:
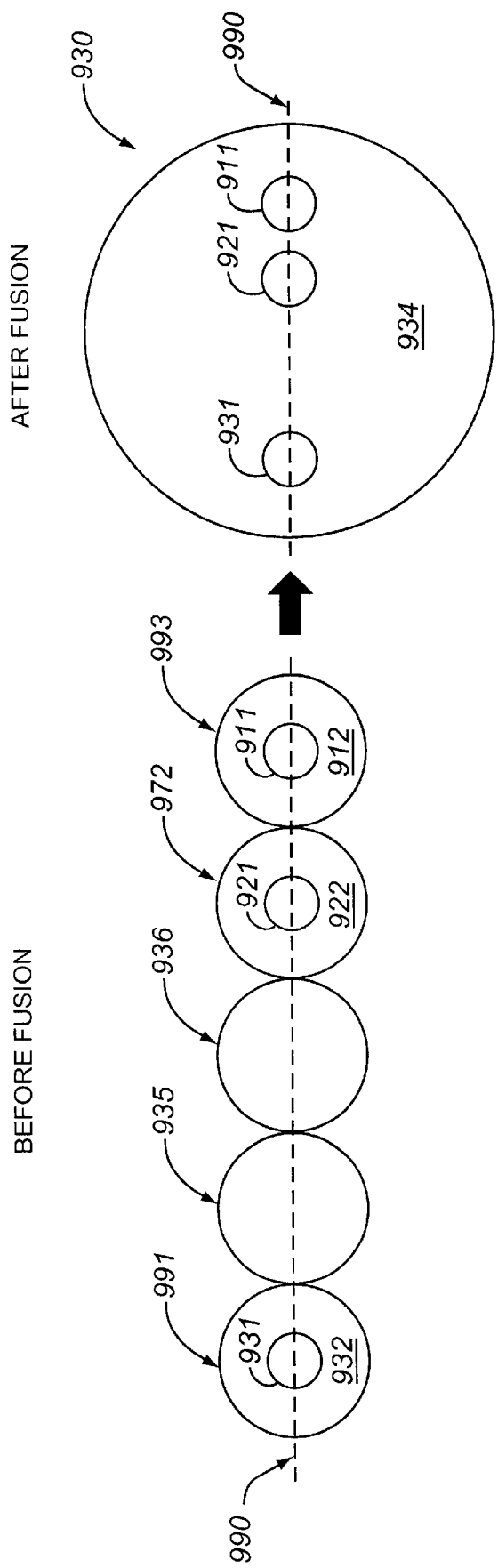
FIG. 9 illustrates a cross-section of one embodiment of a multiple core fiber having multiple non-core spacers.

FIG. 9 illustrates a cross-section of one embodiment of a multiple core fiber having multiple non-core spacers. In one embodiment, two spacers 935 and 936 are positioned between core fibers 991 and 992 that are stripped of their protective jackets. A third core fiber 993 is positioned on the side of core fiber 992 opposite that of core fiber 992. In an alternative embodiment, a different number of spacers may be used in between core fibers. In yet another embodiment, spacers may be placed on the outside of core fibers.

Multiple core fiber 930 is manufactured using a fusion process similar to that described above. After the fusion process, multiple core fiber 930 has three cores 911, 921, and 931, surrounded by a common cladding 934. During the fusion process, the spacers 935 and 936 become fused with the claddings 921, 922, and 932 that surround cores 911, 921, and 931, respectively. The common cladding 934 exists along a length of the claddings and spacers (into the page) that are aligned with each other during the fusion process. The cores 911, 921, and 931 have centers that are substantially aligned in one line 990.

Figure 10:
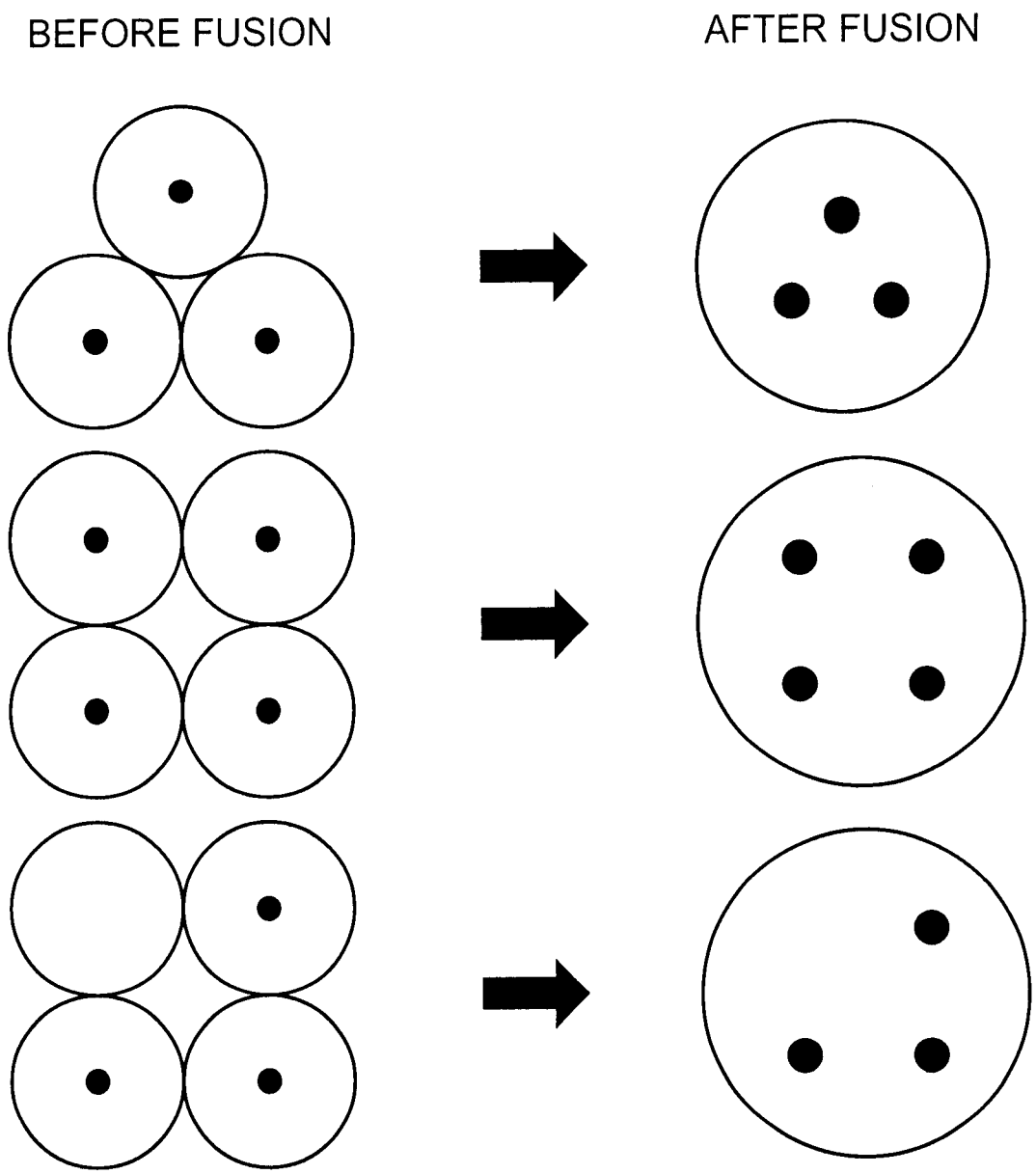
FIG. 10 illustrates cross-sections of alternative embodiments of a multiple core fiber after a fusion process.

It should noted, again, that the dimensions provided herein are only for exemplary purposes and other dimensions may be used. It should also be noted that the above described process is not limited to only fibers having multiple cores substantially aligned within one line, but may also be used to fabricate fibers having cores that aligned in other arrangements as illustrated in FIG. 10.

Figure 11:
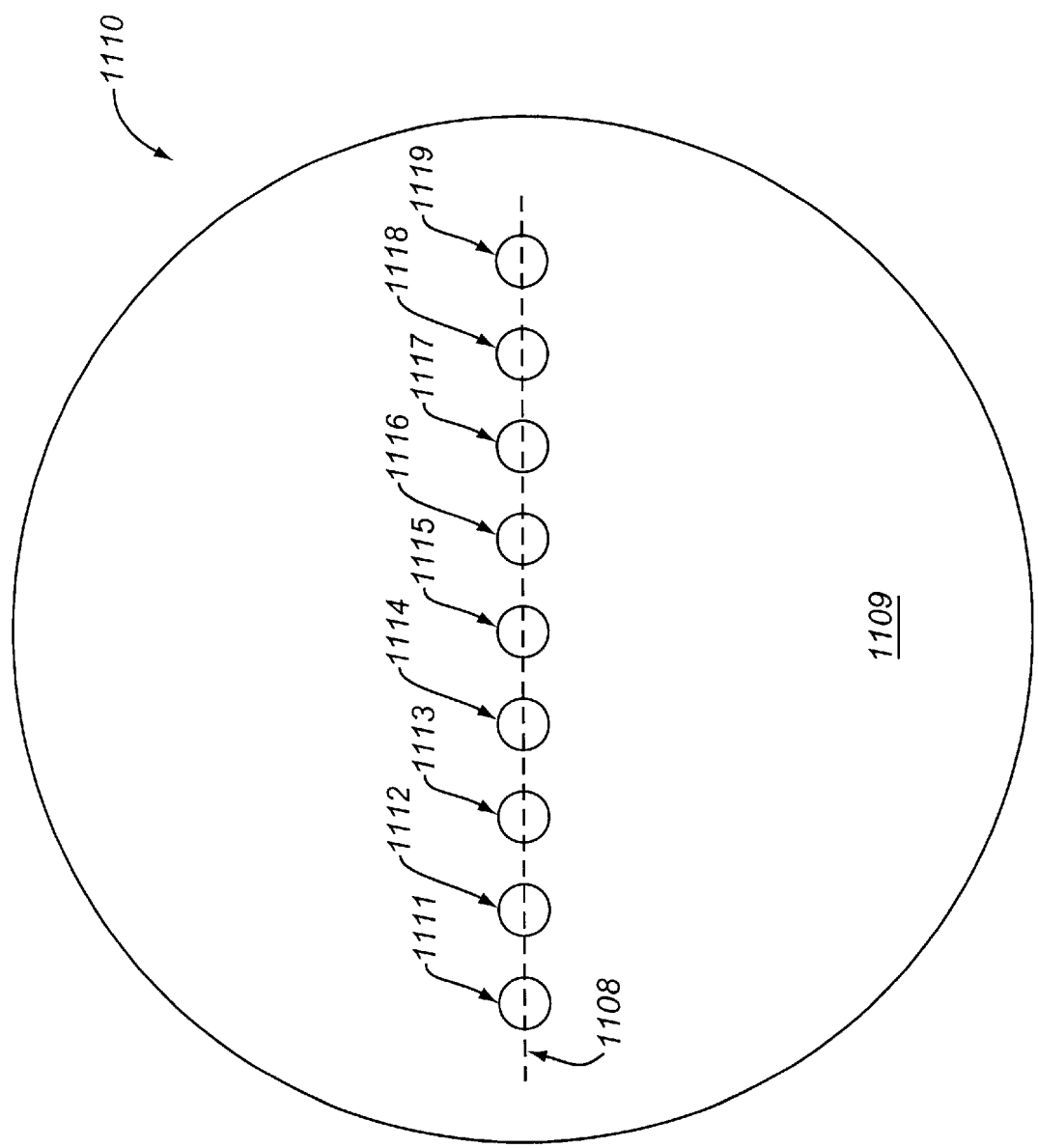
FIG. 11 illustrates a cross-section of another embodiment of a multiple core fiber.

FIG. 11 illustrates a cross-section of another embodiment of a multiple core fiber. It should be noted that nine cores are shown in the figure only for illustration purposes and that a fiber having other than nine cores may also be used. In one embodiment, multiple core fiber 1110 is a thermally expanded multiple core (TEMC) optical fiber that includes nine cores 1111–1119, surrounded by a cladding 1109 (not drawn to scale). The TEMC fiber 1110 is manufactured using nine single core fibers that are stripped of their outer sheaths to expose their claddings along a segment of the fibers.

In one embodiment, TEMC fiber 1110 is fabricated using the fusion process described above. The claddings are aligned together along an exposed length of the claddings. A heat source is applied to the exposed claddings to fuse them together forming a common cladding 1109. The fusion process expands the mode field diameters of the cores 1111–1119 inside the common cladding 1119. The TEMC fiber 1110 is then cut along a cross section of the common cladding 1119 and placed into a capillary tube to create a fiber end having eight non-coupled cores 1111–1119 that are substantially in alignment along one line 1108. In another embodiment, a TEMC optical fiber that is manufactured using other methods may be used. In yet another embodiment, a TEMC fiber having non-core spacers may be used.

In one embodiment, the center core 1115 of the TEMC fiber 1110 is used as the input of an optical switch. Cores 1111–1114 and 1116–1119 form the outputs of the optical switch. In another embodiment, other cores may be used as the input core of an optical switch.

Figure 12:
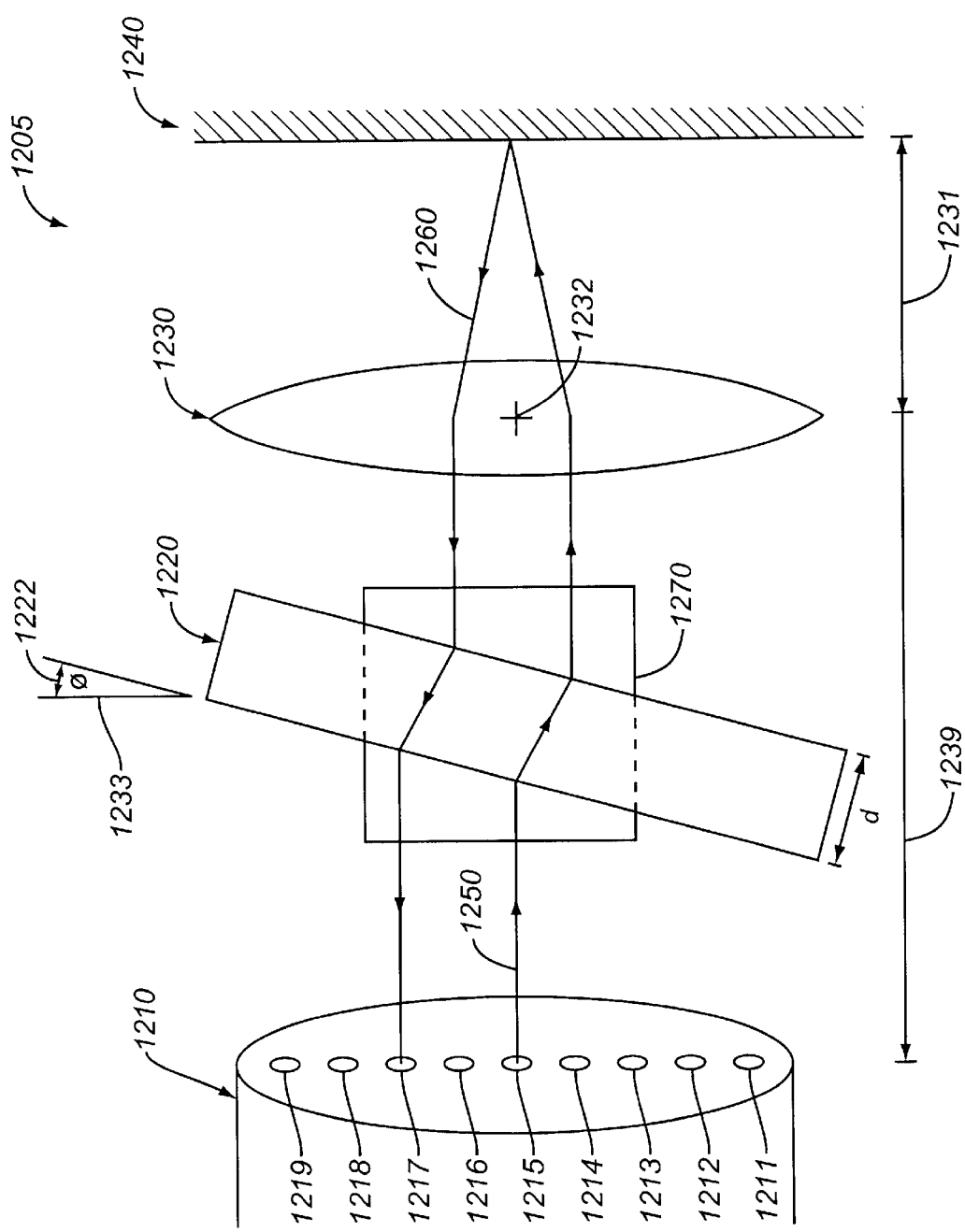
FIG. 12 illustrates one embodiment of an optical switch.

FIG. 12 illustrates one embodiment of an optical switch. The optical switch 1205 includes a TEMC fiber 1210, a displacement plate 1220, a lens 1230, and a mirror 1240. The displacement plate 1220 is constructed from a high index of refraction glass. In one embodiment, displacement plate 1220 is lithium niobate (LiNbO$_3$). LiNbO$_3$ has an index of refraction of approximately 2.2 for 1550 nm wavelength light. In another embodiment, displacement plate 1220 may be constructed from other high refractive index materials, for examples, gallium phosphide (GaP) and silicon. GaP has an index of refraction of approximately 3.05 for 1550 nm wavelength light. Silicon has an index of refraction of approximately 3.5 for 1550 nm wavelength light.

The lens 1230 collimates light received from displacement plate 1220 onto mirror 1240. The lens 1230 also focuses reflected light from mirror 1240 back to the displacement plate 1220. In one embodiment, lens 1230 is constructed from synthetic fused silica. In another embodiment, lens 1230 may be constructed from other glass materials, for example, BK 7. Lens 1230 has a focal length f such that light rays passing through the focal point of the lens are focused at a distance away from the lens proportional to the focal length of the lens. It should be noted that lenses are well known in the art; accordingly, a detailed description of their properties and their operation is not provided herein. The lenses discussed herein may be obtained from industry manufacturers, for example, Melles Griot, Inc. of Irvine, Calif.

The optical switch 1205 components are positioned so that a light beam from the input core of fiber 1210 may be directed to one of the output cores. In one embodiment, core 1215 is used as an input core to propagate a light beam 1250 to one of the output cores 1211–1214 and 1216–1219. Light beam 1250 represents the central ray of divergent light exiting input core 1215. The angular rotation (θ) 1233 of displacement plate 1230 determines which of the output cores 1211–1214 and 1216–1219 receives light beam 1250 from input core 1215. For example, light beam 1250 may be directed to displacement plate 1220 having a predetermined rotation angle 1222. The displacement plate 1220 is positioned between lens 1230 and fiber 1210. Light beam 1250 is refracted at both air-glass boundaries of the displacement plate 1220 and directed to lens 1230 offset from the optical axis 1232 of lens 1230. The fiber 1210 is positioned in front of lens 1230 at a distance 1239. The insertion of the displacement plate 1220 in the optical path of light between the fiber 1210 and lens 1230 moves the effective focal plane of lens 1230. When the angular rotation 1233 of the displacement plate 1220 is zero degrees, the distance 1239 of fiber 1210 away from lens 1230 may be approximated as:

$(d/n)(n-1)+f$ where d is the thickness of displacement plate 1220; n is the refractive index of displacement plate 1220; and f is the focal length, in air, of lens 1230.

The mirror 1240 is positioned in back of the lens 1230 at distance 1231 equal to the focal length of lens 1230. As a result, light beam 1250 will be collimated to mirror 1240 and reflected back to lens 1230 offset from the optical axis of lens 1230. The light beam 1260 reflected off mirror 1240 will be reflected at an angle equal to the angle of incidence of light beam 1250 on mirror 1240. Lens 1230 focuses reflected light beam 1260 onto displacement plate 1220. Light beam 1260 is refracted at both air-glass boundaries. The angular rotation 1222 of displacement plate 1230 causes reflected light beam 1260 to be directed to output core 1217.

By adjusting the angular rotation 1233 of displacement plate 1220, the path of light beam 1250 can be altered to direct light to a different output core. The degree of angular rotation 1233 is a function of the thickness and refractive index of displacement plate 1220. The greater the thickness and the higher the refractive index of displacement plate 1220, the smaller the angular rotation 1233 required to couple light between the input core 1215 and the output cores 1211–1214 and 1216–1219. In one embodiment, the angular rotation 1233 required to couple light from input core 1215 to the outer output core 1219 is approximately 10 degrees. In other embodiments, the angular rotation 1233 required to couple light from input core 125 to the outer output core 1233 may be more or less than 10 degrees.

A motor 1270 is coupled to the displacement plate 1220 and used to rotate displacement plate 1220 to achieve the desired angular rotation. The location of motor 1270 is not critical to the operation of the optical switch. In one embodiment, a solenoid is used to rotate displacement plate 1220. In another embodiment, other types of motors may be used, for examples, a stepper motor and a servo motor. It should be noted that motors are well known in the art; accordingly, a detailed description of their internal components and their operation is not necessary to an understanding of the present invention and are not provided herein.

Because the cores 1211–1219 of TEMC fiber 1210 are spaced close together, the degree of rotation of displacement plate 1220 necessary to couple light from input core 1215 to either one of the output cores is greatly reduced. As a result of the smaller angular rotation, the switching speed of the optical switch may be increased.

In an alternative embodiment, displacement plate 1220 is a mirror and lens 1230 and lens 1240 are not used. The displacement plate mirror is rotated by the motor to reflect a light beam from the input core of fiber 1210 to one of the output cores of fiber 1210. The angular rotation 1233 determines which output core the light beam will be reflected to.

Figure 13:
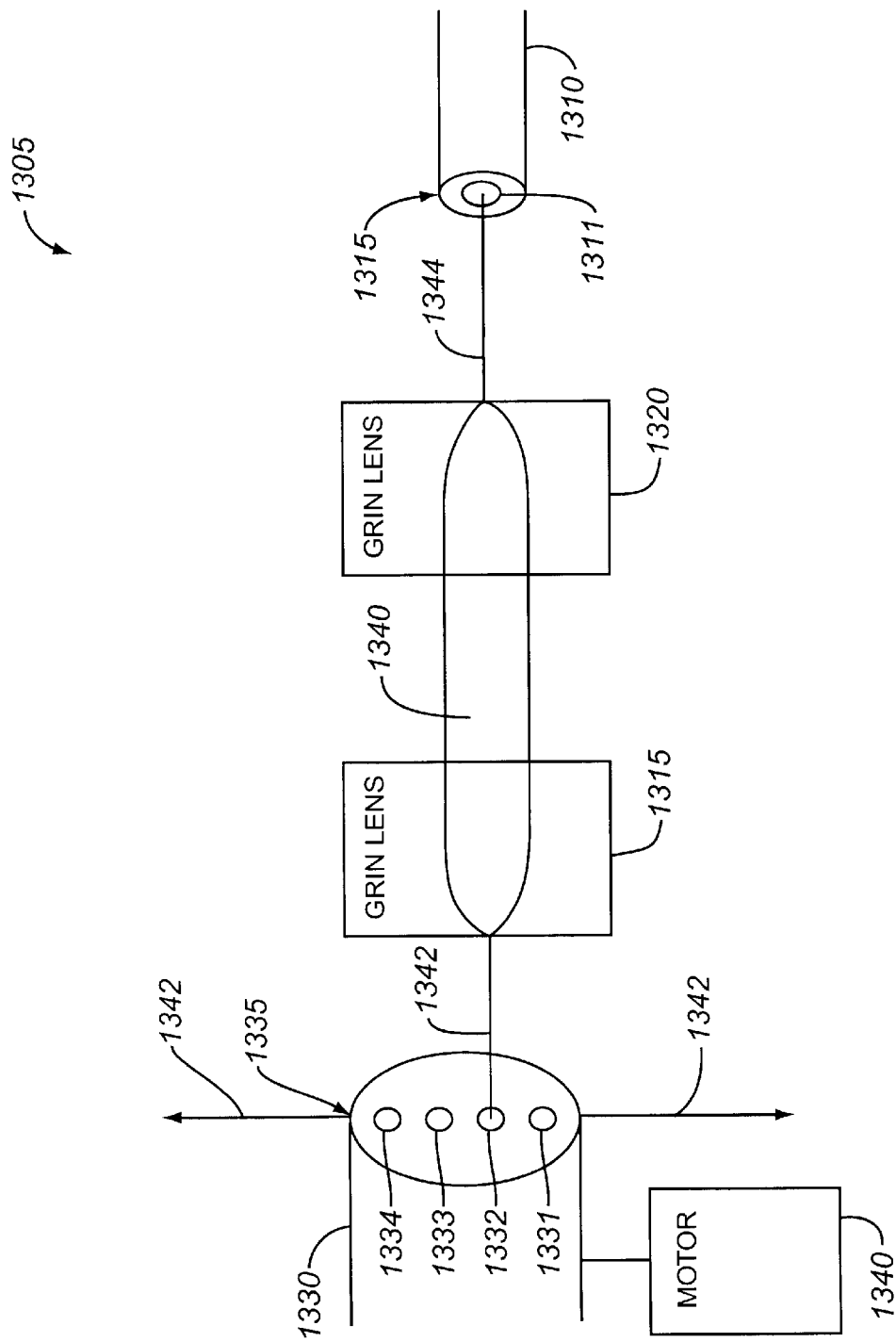
FIG. 13 illustrates another embodiment of an optical switch.

FIG. 13 illustrates another embodiment of an optical switch. Optical switch 1305 includes a TEMC input fiber 1330, two gradient index (GRIN) lenses 1315 and 1320, an output fiber 1310 and a motor 1340. In one embodiment, input fiber 1330 is a TEMC fiber having 4 cores 1331–1334. In another embodiment, input fiber 1330 is a TEMC fiber having more or less than 4 cores.

Input fiber 1330 is mounted to motor 1340. The end 1335 of input fiber 1330 is positioned facing the end 1315 of output fiber 1310. In one embodiment, output fiber 1310 is a single mode fiber. The longitudinal axis of the cores 1331–1334 of input fiber 1310 are aligned with the core 1311 of output fiber 1310. Motor 1340 linearly moves input fiber 1330 along the direction 1342 of alignment of the cores 1330–1334 to selectively couple light from one of the cores 1331–1334 of the input fiber 1330 to the core 1311 of the output fiber 1310. In an alternative embodiment, input fiber 1330 remains stationary and output fiber 1310 is mounted to motor 1340. In one embodiment, motor 1340 is a linear actuator. In another embodiment, other types of motors may be used, for example, a stepper motor. As previously noted, motors are well known in the art and, thus, their details are not discussed herein.

GRIN lenses 1315 and 1320 are positioned between the input fiber 1330 and the output fiber 1310. The longitudinal axis of GRIN lens 1315 and 1320 are aligned with the longitudinal axis of output fiber 1310 and input fiber 1330. Light beam 1342 received by GRIN lens 1320 from one of the cores, for example, core 1331 of input fiber 1330 is expanded and collimated into a larger beam 1340 with approximately a zero degree divergence angle. The expansion of the light beam facilitates alignment by increasing the tolerances between the components. Light beam 1340 is received by GRIN lens 1315 where it is recollimated, light beam 1344, and focused into the core 1311 of output fiber 1310.

In an alternative embodiment, light from input fiber 1330 may be directly coupled to the output fiber 1310 without using GRIN lenses 1315 and 1320 due to the expanded mode field of the cores 1311–1314 of TEMC fiber 1310. Light from the end of a fiber diverges as it exits the fiber. In a typical step index single mode fiber, light diverges at an angle of approximately 6 degrees from the fiber's longitudinal axis (i.e., the general direction of light propagation). For a step index multimode fiber, the divergence angle is approximately double that of single mode fibers. As a result, the transmission of light between an input fiber and an output fiber is dependent on the separation distance between the fiber ends. Any loss in this transmission is referred to as insertion loss.

By reducing the space between the input and output fibers and using an input fiber having expanded mode field diameters, the GRIN lenses 1315 and 1320 may be eliminated from the optical switch 1305. An output fiber with a mode field diameter similar to that of the input fiber is used. The expanded mode fields in TEMC fiber 1310 reduces the divergence angle of light exiting the cores of the fiber. As such, with a lower divergence angle and a close spacing between the fibers 1330 and 1310, insertion loss may be sufficiently low to allow for elimination of GRIN lenses 1315 and 1320.

In an alternative embodiment, an input fiber similar to those illustrated in FIG. 10 is mounted to a motor that rotates the input fiber to selectively couple light from one its cores to core 1311 of output fiber 1310.

Figure 14:
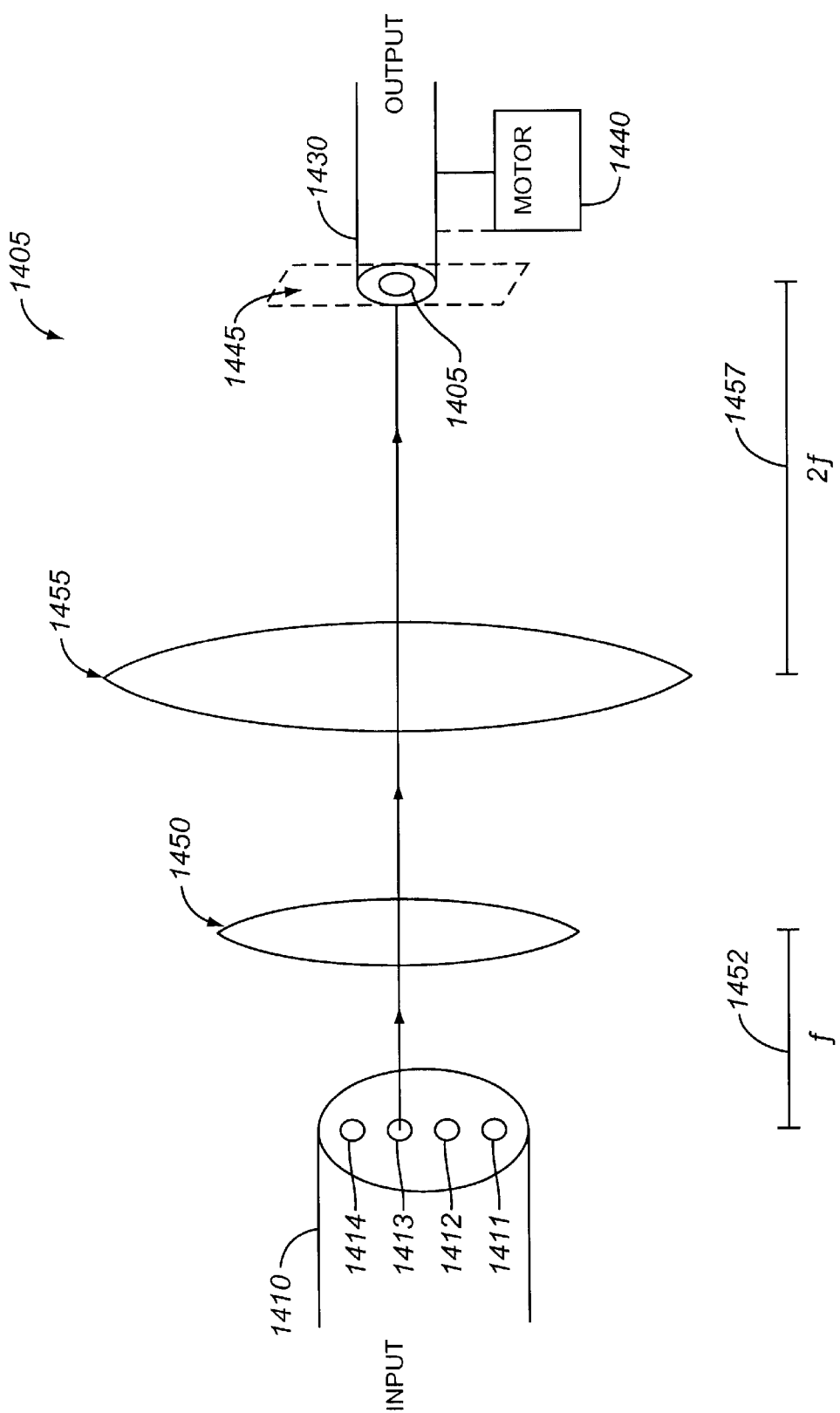
FIG. 14 illustrates yet another embodiment of an optical switch.

FIG. 14 illustrates another embodiment of an optical switch. Optical switch 1405 includes a TEMC input fiber 1410, two lenses 1450 and 1455, an output fiber 1430 and a motor 1440. The output fiber 1430 may be mounted on motor 1440. In one embodiment, input fiber 1410 is a TEMC fiber having 4 cores. In another embodiment, input fiber 1410 may be a TEMC fiber having more or less than 4 cores.

In one embodiment, output fiber 1430 is a single mode fiber having a mode field diameter approximately half that of the mode field diameter of the cores of input fiber 1410. For example, if the mode field diameter of the core 1431 of output fiber 1430 is approximately 10 μm then the mode field diameters of the cores 1411–1414 of input fiber 1410 are approximately 20 μm for 1550 nm wavelength light. In another embodiment, fibers 1410 and 1430 have other mode field diameters and transmit other wavelengths of light, for example, 1300 nm.

Lenses 1450 and 1455 are positioned in between input fiber 1410 and output fiber 1430. Lens 1455 is selected to have a focal length double that of lens 1450. Lens 1450 is positioned a focal length distance 1452 away from the input fiber 1410. Lens 1455 is positioned at a distance 1457 away from output fiber 1430 that is twice distance 1452.

A light beam propagated from one of the cores 1411–1414 of input fiber 1410 is directed through lenses 1450 and 1455 to be focused at a location on plane 1445 parallel with the end of fiber 1435. In this manner, the motor 1440 can move output fiber 1430 to selectively couple light from one of the input fiber cores 1411–1414 based on their location of focus by lens 1455 on plane 1445. In an alternative embodiment, lens 1450 and 1455 are selected to operate with both 1300 nm and 1550 nm wavelength light.

By using the TEMC fiber as described in the above embodiments, the switching speed of the optical switch may be increased because the movement distance of the switching components is reduced due to the closer core spacing in the TEMC fiber. It should be noted, again, that TEMC fibers having a number of cores different from that illustrated in the above embodiments may also be used.

It should be noted, again, that glass plates, lenses, mirrors, and motors are well known in the art; accordingly, a detailed description of their properties and their manufacture is not necessary to an understanding of the present invention and are not provided herein.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An optical switch, comprising:
   a TEMC fiber having an input core and a plurality of output cores; and
   a displacement plate optically coupled to a mirror for coupling a light beam from the input core to the TEMC fiber, the displacement plate and the TEMC fiber being relatively moveable to direct the light beam to one of the plurality of output cores.

2. The optical switch of claim 1, further comprising a motor coupled to the displacement plate, the motor to rotate the displacement plate a predetermined angle to direct the light beam to one of the plurality of output cores.

3. The optical switch of claim 2, wherein the displacement plate is the mirror.

4. The optical switch of claim 1, wherein the displacement plate comprises a transmissive plate having a high index of refraction, the switch further comprising:
   a lens coupled to receive the light beam from the displacement plate and collimate the light beam to the mirror, the mirror coupled to the lens to receive the light beam and reflect the light beam back to the lens, the lens coupled to direct the light beam reflected from the mirror to the displacement plate.

5. An optical switch, comprising:
   a TEMC fiber having a plurality of cores;
   a second fiber having a core; and
   a motor coupled to one of the TEMC fiber and the second fiber, the motor for positioning one of the TEMC fiber and the second fiber to couple a light beam from one of the plurality of cores of the TEMC fiber to the core of the second fiber.

6. The optical switch of claim 5, further comprising:
   a first GRIN lens coupled to receive the light beam from the TEMC fiber and collimate the light beam; and
   a second GRIN lens coupled to receive the collimated light beam from the first GRIN lens, the second GRIN lens refocusing the collimated light beam and directing the refocused light beam to the core of the second fiber.

7. The optical switch of claim 5, wherein each of the plurality of cores has a first mode field diameter and the core of the second fiber has a second mode field diameter, the second mode field diameter smaller than the first mode field diameter.

8. The optical switch of claim 7, further comprising:
   a first lens coupled to receive the light beam from one of the plurality of cores, the light beam having the first mode field diameter; and
   a second lens, the first lens to direct the light beam to the second lens, the second lens coupled to receive the light beam from the first lens, the second lens to direct a second light beam having the second mode field diameter to the second fiber.

9. A method of optical switching, comprising:
   directing a light beam from an input core of a TEMC fiber to a displacement plate, the TEMC fiber having a plurality of output cores, the displacement plate optically coupled to a mirror;
   reflecting the light beam; and
   directing the light beam from the displacement plate to one of the plurality of output cores of the TEMC fiber.

10. The method of claim 9, further comprising:
    directing the light beam from the displacement plate to a lens;
    focusing the light beam from the lens to the mirror;
    reflecting the light beam back to the lens; and
    focusing the light beam from the mirror to the displacement plate.

11. The method of claim 9, wherein the light beam is directed from the displacement plate to one of the plurality of output cores of the TEMC fiber by rotating the displacement plate by a predetermined angle.

12. The method of claim 11, wherein the angle is predetermined to couple the reflected light beam to a corresponding one of the plurality of output cores of the TEMC fiber.

13. A method of optical switching, comprising:
    expanding a first mode field of a plurality of input cores of a TEMC fiber to a first mode field diameter;

expanding a second mode field of an output core of a second fiber to a second mode field diameter;

directing a first light beam having the first mode field diameter from one of the plurality of input cores of the TEMC fiber to the output core of a second fiber; and moving the TEMC fiber to direct a second light beam having the first mode field diameter from another of the plurality of input cores of the TEMC fiber to the output core of the second fiber.

14. The method of claim 13, wherein the first mode field diameter is approximately equal to the second mode field diameter.

15. The method of claim 14, further comprising:

collimating the first and the second light beams from the plurality of input cores of the TEMC fiber, and refocusing the collimated first and second light beams before direction to the output core of the second fiber.

16. The method of claim 14, wherein the second mode field diameter is smaller than the first mode field diameter and the method further comprises:

reducing the first mode field diameter of the first and the second light beams to the second mode field diameter.

* * * * *